Oct. 6, 1964  L. C. MINUTILLA  3,151,654
TRACTION DEVICE FOR VEHICLE TIRES
Filed Dec. 12, 1962  2 Sheets-Sheet 2
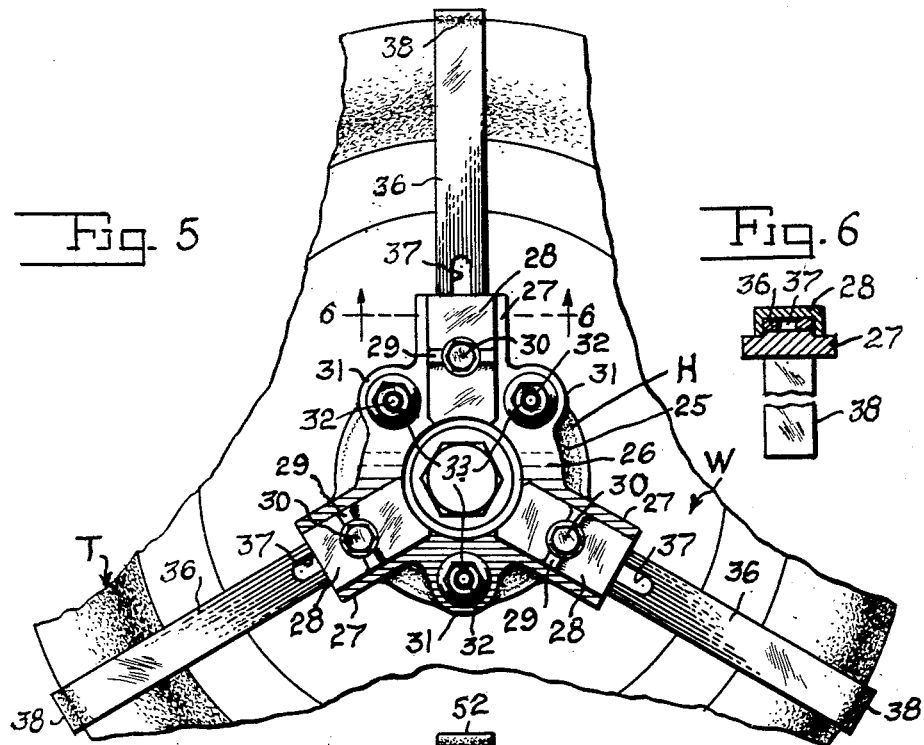
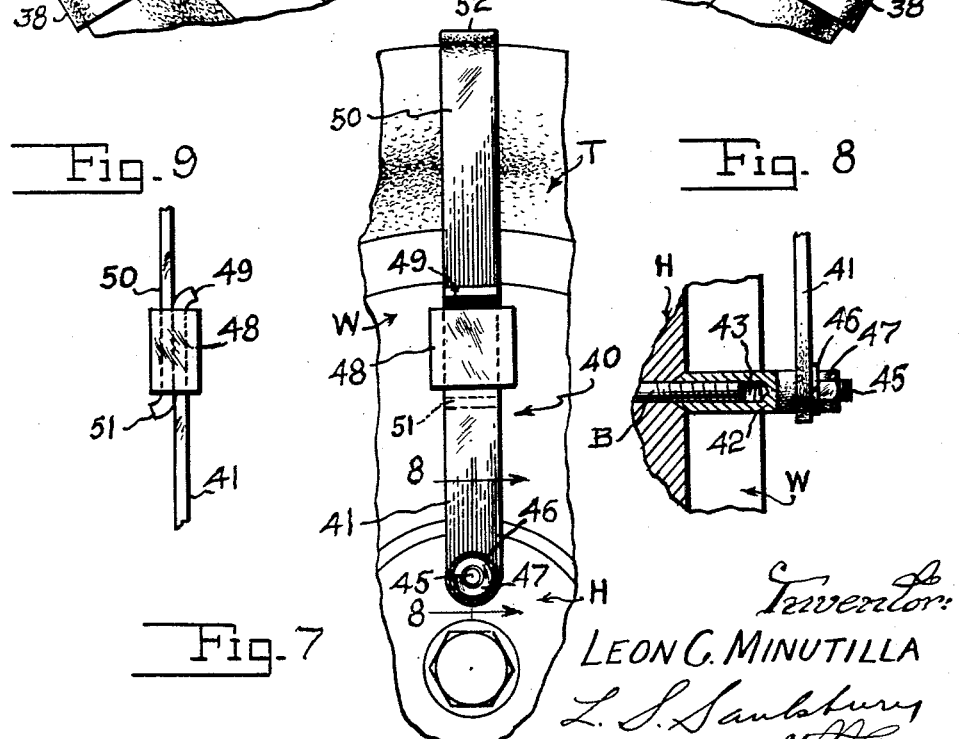
Inventor:
LEON G. MINUTILLA

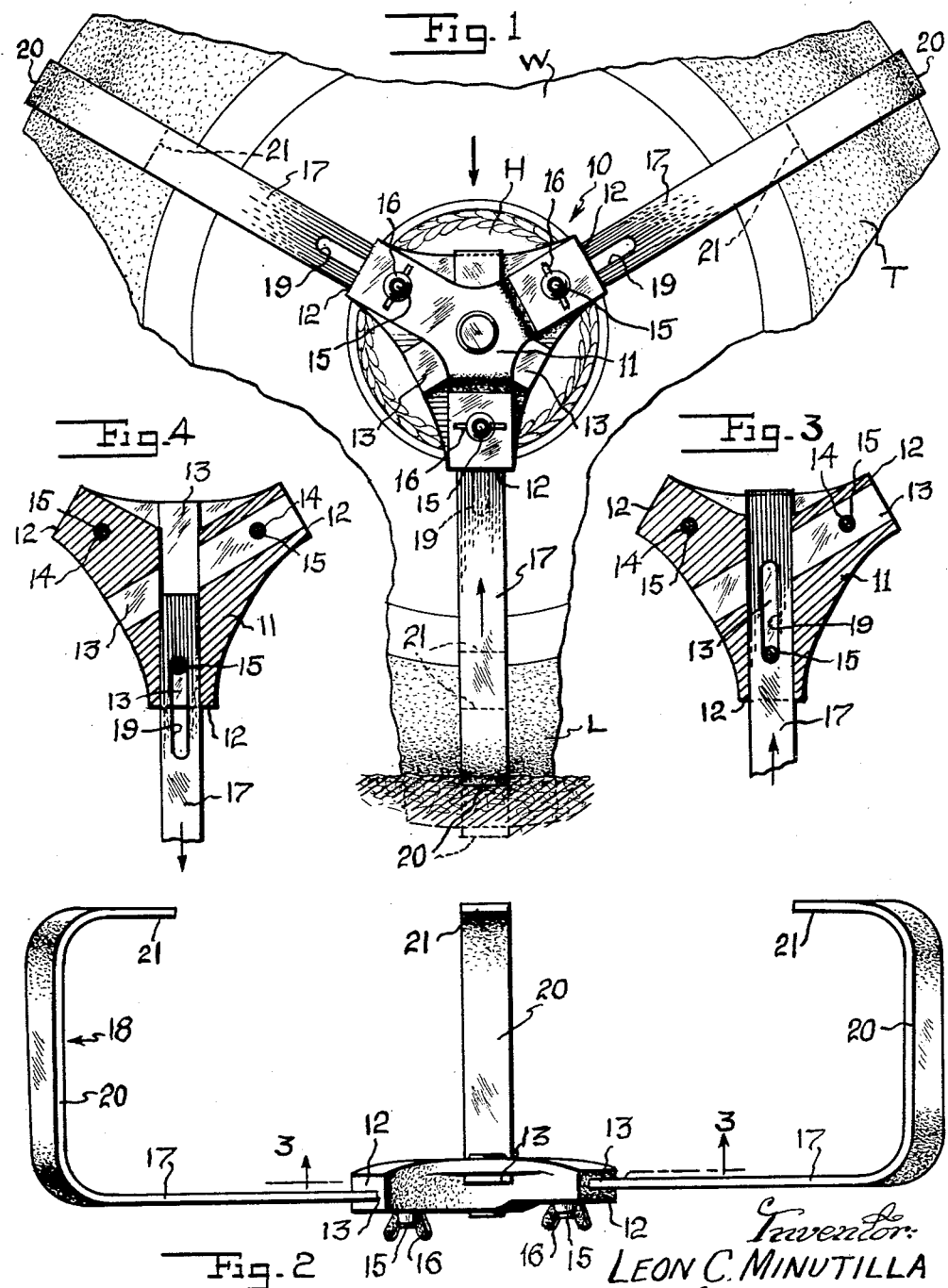

| United States Patent Office | 3,151,654 |
|---|---|
| | Patented Oct. 6, 1964 |

3,151,654
TRACTION DEVICE FOR VEHICLE TIRES
Leon C. Minutilla, New York, N.Y., assignor to Rhode Island Spring Products, Inc., East Providence, R.I., a corporation of Rhode Island
Filed Dec. 12, 1962, Ser. No. 244,169
1 Claim. (Cl. 152—225)

This invention relates to a traction device for vehicle tires and has as its primary object the provision of an improved device which may be readily applied to a vehicle tire or wheel with a minimum of effort and time, and which will provide additional traction to a vehicle wheel under conditions of mud, snow, or other unsuitable conditions.

A very important object of this invention is the provision of a device of this character incorporating a plurality of radially disposed arms which are yieldable in accordance with the diameter of the tire so that they will firstly tightly grip the rim of the tire adjacent the road surface, and will expand as they leave the road surface, and which are further characterized by sufficient yieldability so that in the event a tire to which the article is applied becomes flat, damage to the traction device will be avoided.

A further object of the invention is the provision of a device of this character which is automatically adjustable as to length to compensation for variations in tire diameter occasioned by pressure differences in a pneumatic tire, as for example, when the tire goes flat, in which event, in the case of a rigid or non-adjustable structure, severe damage to the device would result.

Still other objects reside in the combinations of elements, arrangements of parts, and features of construction, all as will be more fully pointed out hereinafter, and disclosed in the accompanying drawings wherein there are shown preferred embodiments of this inventive concept.

In the drawings:

FIGURE 1 is a plan view of one form of traction device constructed in accordance with the instant invention shown as applied to a vehicle wheel, parts of the latter being broken away.

FIG. 2 is a side or edge elevational view of the device of FIG. 1 removed from the wheel.

FIG. 3 is a sectional view taken substantially along the line 3—3 of FIG. 2 as viewed in the direction indicated by the arrows showing the device in collapsed position, or a position of minimum diameter.

FIG. 4 is in a view similar to FIG. 3 showing the device in maximum extended position.

FIG. 5 is a view similar to FIG. 1 but disclosing a modified form of construction.

FIG. 6 is a fragmentary sectional view taken substantially along the line 6—6 of FIG. 5 as viewed in the direction indicated by the arrows, parts being broken away.

FIG. 7 is a plan view of a still further modified form of construction using a single radial element rather than a multiplicity thereof, parts of the vehicle wheel being broken away.

FIG. 8 is a fragmentary sectional view taken substantially along the line 8—8 of FIG. 7 as viewed in the direction indicated by the arrows, and, FIG. 9 is a fragmentary side elevational view of a constructional detail shown in FIG. 7.

Similar reference characters refer to similar parts throughout the several views of the drawings.

Having reference now to the drawings in detail and more particularly to the species of invention disclosed in FIGS. 1 to 4 inclusive, the device of the instant invention is generally indicated at 10 and comprises a substantially triangular hub portion 11, in the illustrative embodiment herein shown, which includes relatively flat surfaces 12 at what would normally be the apices of the triangle. Each flat surface 12 is provided with a transversely extending radial slot 13, which slots are, as best shown in FIG. 2, in superposed relation or lying in planes one above the other, for a purpose which will be more fully described hereinafter. A bore 14 intersects each slot 13 and is provided with a threaded bolt or pin 15, upon the projecting extremity of which is mounted a wing nut 16. An arm 17 comprising a part of a traction device, generally indicated at 18, extends radially into each slot 13, and is provided with a longitudinal closed slot 19 into which a pin or bolt 15 extends, the closed ends of the slot thus serving to limit the travel of arm 17 in its associated slot 13. The traction device 18 includes the arm 17 each of which extends radially of the tire as best shown in FIG. 1, and has an offset portion 20 extending at substantially right angles thereto which extends over the top of the periphery of the tire, and terminates in a reverted or inwardly extending section 21 or hook section which extends downwardly over the inner edge of the tire rim in order to secure the device in related assembly without the necessity for any connection to the wheel per se.

In the use and operation of the device hub section 11 is positioned over the hub H of the vehicle wheel W with the section 20 overlying the periphery of the tire T and the portion 21 extending downwardly on the inner side of the tire. The device should be individually measured for each size of tire so that it may be conveniently fitted thereon, and the arms 17 may be disassembled by removal of the bolts 15 and their associated wing nuts 16 for positioning on the wheel. The arrangement is such that no clamping is effectuated by wing nuts 16 so that the arms 17 are free to travel in their associated slots 13 limited only by the engagement of the pins or bolts 15 with the opposite ends of the slots 19. It will thus be seen that in the event the lower portion L of tire T is materially compressed, the adjacent arm 17 and its associated traction surface 20 merely slides into its associated slot 13 to the desired extent, thus avoiding all damage thereto in the event of a flat tire or low pressure or other condition which might, in the event of a rigid member, occasion breakage thereof.

FIGS. 5 and 6 disclose a modified form of construction wherein a traction device generally indicated at 25 includes a hub portion 26 having three radially extending arms 27, each arm being provided with a socketed housing 28 having a cross piece 29 with a central bore into which extends a bolt 30 corresponding to the bolt 15 of the previous modification.

Lugs 31 positioned between the arms 27 contain bolt holes which are adapted to fit over the mounting bolts 32 of the vehicle hub H. Nuts 33 serve to hold the hub 26 in position on the mounting bolts.

Arms 36 having longitudinally extending closed slots 37 therein engage in the sockets 28, and function slidably in the same manner as the previously described arms 17. Arms 36 are provided at their extremities with transversely extending traction portions 38 which extend over the periphery of the tire T mounted on the vehicle wheel W, and serve the same function as the previously described traction devices. In the instant modification, due to the fact that the hub 26 is permanently secured to the wheel hub H, reverted portions corresponding to the portions 21 of the previous illustrative embodiment are not necessary, since the device is self-retained on the wheel hub. In use and operation the same extension and retraction of the arms 36 is effectuated in the event that pressure in the tire is decreased.

Still another modified form of the invention is disclosed in FIGS. 7, 8 and 9. Here a traction device generally indicated at 40 is comprised of a single radial arm including an inner section 41 which has affixed to its inner end a right annularly disposed sleeve 42 which is provided with an internally threaded bore 43 which engages the threads on a conventional mounting bolt B mounted on the vehicle hub H. The hub H carries the vehicle wheel W and tire T in the conventional manner. A threaded extremity 45 extends from sleeve 42 through an opening in inner arm section 41, the latter being fixed thereto by means of a washer 46 and nut 47.

The outer or free end of inner arm section 41 extends through a central opening in a rectangular sleeve 48 and is slidable therein. An upwardly turned extremity 49 precludes complete retraction of arm section 41 from sleeve 48, which also slidably encompasses the inner end of an outer arm section 50 which is also provided with an oppositely disposed reverted end 51. The outer extremity of outer arm section 50 is provided with a transversely extending traction element 52 which extends across the outer periphery of tire T, and functions in the same manner as the previously described traction devices. In this form of the device the inner and outer arm sections 41 and 50 may obviously slide relative to one another within the confines of the sleeve 48, the reverted ends 49 and 51 serving to preclude complete withdrawal of the arm sections from the sleeve, but with internal movement being relatively unlimited in the event that the tire T becomes flat. Any desired number of traction devices 40 may be applied annularly about the hub and secured to any desired number of mounting bolts B. In certain instances one member 40 is adequate, while in other instances, two, three, four or more may be employed if deemed necessary or desirable.

From the foregoing it will now be seen that there is herein provided an improved automatically adjustable traction device, which accomplishes all of the objects of this invention, and others including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

I claim:

A traction device for a vehicle comprising a central triangular shaped solid block constituting a hub, said block having radial guide slots intersecting the apices of the triangles thereof, said slots intersecting each other, said block having transverse bores intersecting the slots, said hub adapted to be disposed alongside the wheel in substantially coaxial relation thereto, radial arms extending slidably into the slots, said arms having offset portions extending at right angles to the bodies of the arms, said offset portions terminating in hook sections, said offset portions and hook sections adapted to be hooked over a vehicle tire, said arms having elongated closed slots longitudinally thereof and communicating with the slots and bores, in the block, said arms being readily removable from the slots by being drawn outwardly relative thereto, and means for fastening the offset portions and hook sections about the tire and for automatically varying the length of the arms in accordance with the effective diameter of the wheel and tire in accordance with the air pressure within the tire, said means including threaded bolts extending through the aligned slots in the block and arms and bore and extending outwardly of the block, and wing nuts on the outwardly extending ends of the bolts.

References Cited in the file of this patent

UNITED STATES PATENTS

| | | |
|---|---|---|
| 1,308,705 | Gajan | July 1, 1919 |
| 1,882,376 | Weber | Oct. 11, 1932 |
| 2,463,605 | Devine | Mar. 8, 1949 |
| 2,474,696 | Schwab | Jun. 28, 1949 |
| 2,517,634 | Daley | Aug. 8, 1950 |
| 2,527,939 | Krider | Oct. 31, 1950 |
| 2,754,874 | Gardner | July 17, 1956 |
| 3,016,079 | Weller | Jan. 9, 1962 |
| 3,071,173 | Hoffmann | Jan. 1, 1963 |